US010723889B2

(12) United States Patent
Anderson et al.

(10) Patent No.: US 10,723,889 B2
(45) Date of Patent: *Jul. 28, 2020

(54) AMBIENT CURE, FAST DRY AUTOMOTIVE REFINISH PRIMER SURFACER COMPOSITIONS AND METHODS OF USE

(71) Applicant: Dow Global Technologies LLC, Midland, MI (US)

(72) Inventors: Jeff R. Anderson, Tomball, TX (US); John N. Argyropoulos, Midland, MI (US); Nahrain E. Kamber, Midland, MI (US); Rebecca S. Ortiz, Midland, TX (US); Christopher D. Rainey, Bay City, MI (US); Gary E. Spilman, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 177 days.

This patent is subject to a terminal disclaimer.

(21) Appl. No.: 14/721,438

(22) Filed: May 26, 2015

(65) Prior Publication Data

US 2015/0344699 A1    Dec. 3, 2015

Related U.S. Application Data

(60) Provisional application No. 62/004,466, filed on May 29, 2014.

(51) Int. Cl.
| | | |
|---|---|---|
| *C09D 5/00* | (2006.01) | |
| *C09D 175/16* | (2006.01) | |
| *B05D 3/00* | (2006.01) | |
| *C09D 7/61* | (2018.01) | |
| *C08G 71/04* | (2006.01) | |
| *C09D 175/12* | (2006.01) | |

(52) U.S. Cl.
CPC ............. *C09D 5/002* (2013.01); *B05D 3/007* (2013.01); *C08G 71/04* (2013.01); *C09D 7/61* (2018.01); *C09D 175/12* (2013.01); *C09D 175/16* (2013.01)

(58) Field of Classification Search
CPC .. C08G 71/04; C08G 18/3831; C08G 18/792; C09D 5/001; C09D 7/1216; C09D 175/16; C09D 175/04; C09D 175/12; C09D 5/002; C09D 7/61; C08L 75/04; C08L 61/20; C08L 33/14; B05D 3/007
See application file for complete search history.

(56) References Cited

U.S. PATENT DOCUMENTS

| | | | |
|---|---|---|---|
| 5,288,802 A | 2/1994 | Walters et al. | |
| 5,336,566 A | 8/1994 | Rehfuss | |
| 5,665,433 A | 9/1997 | Moussa et al. | |
| 6,169,150 B1 | 1/2001 | Swarup et al. | |
| 2002/0151615 A1* | 10/2002 | Tortorello | ........... C03C 25/1065 |
| | | | 522/96 |
| 2011/0313091 A1 | 12/2011 | Argyropoulos et al. | |
| 2013/0172472 A1 | 7/2013 | Greyson et al. | |

FOREIGN PATENT DOCUMENTS

| | | |
|---|---|---|
| EP | 2397506 A1 | 12/2011 |
| EP | 2749596 A1 | 7/2014 |
| EP | 2883698 A1 | 6/2015 |
| WO | 1998014488 A1 | 4/1998 |
| WO | 2014/204663 A1 | 12/2014 |
| WO | 2014/205044 A1 | 12/2014 |

OTHER PUBLICATIONS

Resene "Volume solids, PVC and hiding power" Aug. 2005.*
"Coatings and Pigments Standard Application Manual" Military Yi Wen Press, vol. 1, Apr. 30, 2005, p. 487.
Qingshan, Ji, "Automotive Painting Repair Technology," China Railway Press, Jun. 30, 2012, pp. 24-25.

* cited by examiner

*Primary Examiner* — Robert S Walters, Jr.
(74) *Attorney, Agent, or Firm* — Andrew E. Merriam; Cantor Colburn LLP

(57) ABSTRACT

The present invention provides substantially isocyanate-free multicomponent compositions useful in making rapid dry automotive primer compositions and coatings, the compositions having a % PVC of from 20 to 60, or preferably, from 25 to 50, and comprising one or more pigment, extender or filler, one or more a) polycarbamates from alkyd polyol or acrylic polyol and one or more b) a polyaldehydes or the acetal or hemiacetal thereof as a second component. The multicomponent compositions cure quickly at a temperature of from 0° C. to less than 80° C. to form a crosslinked polyurethane which dries to enable sanding after only 15 to 45 minutes.

12 Claims, No Drawings

AMBIENT CURE, FAST DRY AUTOMOTIVE REFINISH PRIMER SURFACER COMPOSITIONS AND METHODS OF USE

The present invention relates to ambient to low temperature (less than 80° C.) curable multicomponent polycarbamate and polyaldehyde compositions useful as sandable automotive primers and which are substantially isocyanate free and which cure to form a crosslinked polyurethane. More particularly, it relates to multicomponent compositions useful as sandable automotive primers having a pigment volume concentration (% PVC) of from 20 to 60 and comprising one or more pigments, extenders and/or fillers, one or more a) polycarbamates of an alkyd polyol or an acrylic polyol, and b) one or more polyaldehydes in a component separate from the one or more polycarbamates.

The automotive refinish process generally involves filling and sanding of the surface to be refinished, application of at least one and often several coats of undercoat or primer, followed by applications of an optional primer sealer then a pigmented basecoat and clear coat to achieve the desired finish. A primer surfacer is a primer that is designed to provide adhesion between the substrate surface and the basecoat and clear coat; it is analogous to a traditional primer. The primer surfacer also provides corrosion resistance and fills any defects or imperfections in the substrate surface prior to painting. When sanded, the primer surfacer results in a smooth surface for application of topcoats. Automotive refinish end-users often do not use oven-forced curing of primers, and therefore rely on ambient curing which is time-consuming, generally taking hours to cure. In addition, as several coats of primers are usually applied then are allowed to cure, sanded and cleaned before application of basecoats and topcoats, the automotive refinishing process can be quite time consuming.

The use of polyurethanes in automotive coating compositions, including primers, is generally known; such compositions may be ambient to low temperature (less than 80° C.) curable and provide crosslinked coatings having good to excellent hardness, scratch resistance and solvent resistance. However, such currently available compositions contain toxic (poly)isocyanates. Further, the cure of such known automotive primers still takes hours to days, even if the cure is catalyzed; still further, it takes several hours for the automotive primer to dry to a point where it is sandable, i.e. the dry to sand time.

Recently, patent publication no. US2011/0313091A1, to Anderson et al. discloses a substantially isocyanate free, ambient to low temperature (less than 80° C.) curable multicomponent composition for aldehyde-crosslinking of carbamates for making polyurethanes; however, the composition fails to disclose any composition for making a sandable automotive primer and fails to provide any composition having a short dry to sand time of, for example, 60 minutes or less.

The present inventors have sought to solve the problem of providing a substantially isocyanate free primer composition that enables a short dry to sand time under ambient to low temperature conditions (e.g. 80° C. or less).

STATEMENT OF THE INVENTION

1. In accordance with the present invention, substantially isocyanate free, ambient to low temperature (less than 80° C.) curable, multicomponent primer compositions useful as sandable automotive primers and having a pigment volume concentration (% PVC) of from 20 to 60 or, preferably, from 25 to 50, or, more preferably, 30 to 45, and comprise one or more pigments, extenders and/or fillers, one or more a) polycarbamates of an alkyd polyol, an acrylic polyol, or their mixtures, and one or more b) polyaldehydes or acetals or hemiacetals thereof in a component separate from the one or more polycarbamates.

2. The compositions of the present invention in accordance with 1, above, wherein the compositions further comprise one or more acid catalysts or one or more metal drier, preferably an iron drier.

3. The compositions of the present invention in accordance with 1 or 2, above, wherein the one or more a) polycarbamates is a polycarbamate prepared from an alkyd polyol having a hydroxyl number from 50 to 250 or, preferably, from 100 to 200.

4. The compositions of the present invention in accordance with 3, above, wherein the alkyd polyol is a short or medium oil alkyd polyol.

5. The compositions of the present invention in accordance with 3, above, wherein the alkyd polyol is a drying oil alkyd polyol.

6. The compositions of the present invention in accordance with 3, above, wherein the alkyd polyol is the reaction product of one or more monocarboxylic fatty acid, or triglyceride, one or more polycarboxylic acid having two or more carboxylic acid, salt or halide groups, and one or more polyalcohol having two or more, or, preferably 4 or more hydroxyl groups, such as erythritol or pentaerythritol.

7. The compositions of the present invention in accordance with 1 or 2, above, wherein the one or more a) polycarbamates is a polycarbamate prepared from an acrylic polyol having an hydroxyl number of from 50 to 250, or, preferably, from 100 to 200.

8. The compositions of the present invention in accordance with 1 or 2, above, wherein the one or more b) polyaldehydes, acetals or hemiacetals thereof is a cycloaliphatic dialdehyde, preferably, a 1,3 cyclohexanedicarboxaldehyde (CHDA), a 1,4 cyclohexanedicarboxaldehyde (CHDA), their admixture, or acetals or hermiacetals thereof.

9. The compositions of the present invention in accordance with any of 1 to 8, above, wherein the compositions further comprise one or more curing inhibitors, such as, for example, water or an alcohol, preferably a $C_1$ to $C_5$ alkyl alcohol.

10. The compositions of the present invention in accordance with any of 1 to 9, above, wherein the compositions comprise one or more pigment and one or more extender, preferably titanium dioxide as the pigment and talc or silica as the extender.

11. In another aspect, the present invention provides methods for using the compositions in accordance with any of 1 to 10, above, comprising applying the composition to an automotive substrate, such as metal, pretreated metal, primed metal, or plastics, such as thermoplastic polyolefins (TPO) to form a primer coating layer, curing the primer coating layer to form a crosslinked polyurethane at a temperature of from ambient to 80° C., or, preferably, from ambient to 60° C., or, preferably, from ambient to 30° C. for a period long enough to enable sanding of the coating layer, and sanding the primer coating layer to form a smooth primer coating layer.

12. The methods in accordance with 11, above, where the primer coating layer can be sanded in from 20 minutes to 2 hours, or, preferably 1 hour or less, or, more preferably, 45 minutes or less.

13. The methods in accordance with any of 11 to 12, above, further comprising applying a pigmented basecoat or colorcoat composition to the smooth coating layer or smooth multilayer coating and to form a pigmented basecoat or colorcoat layer and curing the pigmented basecoat or colorcoat layer to form a cured pigmented basecoat or colorcoat.

14. The methods in accordance with 13, above, further comprising applying a clearcoat composition to the cured pigmented basecoat or colorcoat layer, and curing the clearcoat composition to form an automotive coating finish.

15. An automotive finish comprising an automotive substrate, such as metal, pretreated metal, primed metal, or plastics, such as thermoplastic polyolefins (TPO), one or more crosslinked polyurethane smooth primer coating layers from the compositions of any of 1 to 10, above, on the automotive substrate, a cured pigmented basecoat or colorcoat layer on the one or more smooth primer coating layers, and a cured clearcoat layer on the cured pigmented basecoat or colorcoat layer.

As used herein, the term "ASTM" stands for ASTM International, the name of an organization headquartered in West Conshohocken, Pa., USA.

As used herein, the term "alkyd" means a polyester made from reacting one or more polyalcohols and one or more polycarboxylic acids, along with one or more monocarboxylic acids, such as long-chain fatty acids, their corresponding triglycerides, and mixtures thereof. The term "oil-based alkyd resin" means a polyester which has been modified by addition of saturated or unsaturated fatty acids or their corresponding triglycerides; and the term "oil-free alkyd resin" means polyesters that have been modified by addition of saturated monocarboxylic acids.

As used herein, the term "drying alkyd resins" means those alkyds made from polyunsaturated fatty acids or triglycerides (drying oils), such as linseed oil, that can dry by air oxidation, or autoxidative drying. Drying alkyds are usually used as the film former of coatings or inks.

As used herein, the term "non-drying alkyd resins" means those alkyds made from non-drying monocarboxylic acid oils, such as coconut oil. Non-drying alkyds may be crosslinked through their hydroxyl functional groups to become part of the film-former.

As used herein, terms referring to "oil lengths" of alkyd resins, e.g. short oil, medium oil or long oil alkyd refer to the proportion of the oil or fatty acid in the alkyd resin, by the weight percent of monocarboxylic acid oils, fatty acids or triglycerides in the alkyd, based on total solids. Alkyd resins are classified, as follows: "Very long" is over 70%, "long" is 56-70%, "medium" is 46-55% and "short" is below 45%.

As used herein, the term "ambient temperature" means room temperature and "ambient temperature curable" means capable of reacting in a chemically transforming process at from 0° C. to less than 80° C.

As used herein, the term "average number of carbamate groups" means the total number average molecular weight of a given polycarbamate as determined by gel permeation chromatography (using a polystyrene standard) divided by the carbamate equivalent weight of the polycarbamate. The carbamate equivalent weight (CEW) on solids is calculated using the following equation:

$$CEW = (OHEW_{polyol} + (43 \times Carbamate\ Conversion)) \div Carbamate\ Conversion,$$

wherein the carbamate conversion is approximated using the following equation:

$$Carbamate\ Conversion = (OH\ \#_{polyol} - OH\ \#_{polycarbamate}) \div OH\ \#_{polyol}.$$

Note that a Carbamate Conversion can be expressed as a percentage when multiplied by 100%.

As used herein, the term "curing" means subjecting to conditions effective for chemically transforming a material, such as by crosslinking it or hardening it.

As used herein, the term "curing temperature" means the degree of heat or cold effective for chemically transforming the ambient temperature curable multicomponent compositions of the present invention to form a crosslinked polyurethane.

As used herein, the term "calculated oil content (%)" means for an alkyd polyol the weight proportion of the weight percent of monocarboxylic acid oils, fatty acids or triglycerides in the alkyd, based on total solids used to make the alkyd polyol.

As used herein, the term "OH value (mg KOH/g)" or "hydroxyl number" or "OH number" means for an alkyd polyol or an acrylic polyol the amount in milligrams of potassium hydroxide (KOH) per gram polyol (mg KOH/g polyol) determined by following the titration methods set forth in ASTM D4274-11 (Standard Test Methods for Testing Polyurethane Raw Materials: Determination of Hydroxyl Numbers of Polyols (2011) Test Method A) performed at room temperature using as reagents 4-(dimethylamino) pyridine catalyst in tetrahydrofuran (THF) and acetic anhydride in THF and as titrant with 1N KOH in methanol.

As used herein, the term "AV (mg KOH/g)" or "acid number" means the acid value of an alkyd polyol or acrylic polyol as determined by following the titration methods set forth in ASTM D1639-90 (1996) at room temperature using 0.1 N potassium hydroxide in methanol as titrant and a 50/50 (v/v) mix of isopropanol and xylenes as solvent.

As used herein, the term "extender" and the term "filler" are used interchangeably.

As used herein, the term "hydroxyl equivalent weight" or OHEW of an acrylic polyol means the quantity calculated by dividing the weighted average of the molecular mass of all hydroxyl containing acrylic or vinyl monomers in the total monomer mixture used to make the acrylic polyol by the weight proportion of hydroxyl containing acrylic or vinyl monomer in the monomer mixture and multiplying the result by the weighted average number of hydroxyl groups in all hydroxyl containing acrylic or vinyl monomers used to make the acrylic polyol. For example, if an acrylic polyol results from the polymerization of 25 wt. % total hydroxyl containing acrylic or vinyl monomers in the total monomer mixture used to make the acrylic polyol and the hydroxyl containing acrylic or vinyl monomers are half hydroxyethyl methacrylate (has one hydroxyl group and a molar mass of ~130 g) and half glyceryl methacrylate (has two hydroxyl groups and a molar mass of ~160 g), the hydroxyl equivalent weight is calculated as the amount $((130 \times 0.5) + (160 \times 0.5))/0.25$ multiplied by $((1 \times 0.5) + (2 \times 0.5))$ or $145/0.25 \times 1.5$ or 870.

As used herein, the term "multicomponent composition" means a composition comprising two or more components, each one having at least one ingredient.

As used herein, the term "polyaldehyde" means a molecule containing two or more aldehyde groups or their hydrates, or as acetals or hemiacetals, wherein the molecule is capable of performing as described herein and is capable of reacting with the polycarbamate during the invention curing step so as to form the invention crosslinked polyurethane. The aldehyde group can be written herein as —C(=O)H or —CHO. The term "polyaldehyde" is not used herein to mean a polymeric substance made by self-polymerizing an aldehyde monomer.

As used herein, the term "polycarbamate" means a molecule containing an average of two or more carbamate groups (H₂NC(O)O—), wherein the molecule is capable of reacting with a polyaldehyde during curing so as to form a polyurethane.

As used herein, the term "pigment volume concentration" or "% pigment volume concentration" or "% PVC" means the quantity determined by the following equation for the entire multicomponent composition:

$$100\% \times \frac{(\text{volume of pigment(s)} + \text{volume of extender(s)} + \text{volume of filler(s)})}{\text{total dry volume of coating}}.$$

As used herein, the term "solvent/diluents" as used herein comprises all conventional non-polar and polar organic solvents and diluents.

As used herein, the term "substantially free of isocyanate groups" or "substantially isocyanate-free" means having from 0 to 5 mole percent (mol %) of —N=C=O groups (i.e., isocyanate groups) based on total moles of carbamate groups plus isocyanate groups in the composition, preferably, less than 3 mol %, or, more preferably, less than 1 mol %, and, still more preferably, less than 0.1 mol %.

As used herein, the term "substantially formaldehyde free" is less than 500 ppm based on the total weight of polyaldehyde solids.

As used herein, the term "total solids" or "solids" refers to resins, reactants and all non-volatile additives or ingredients, including catalysts; solids does not include water or volatile solvents (which volatilize under use conditions of cure at from 0 to 80° C.).

As used herein, the term "wt. %" means weight percent or percent by weight.

Unless otherwise stated, all units of pressure and temperature refer to standard pressure and room temperature.

All phrases comprising parentheses denote either or both of the included parenthetical matter and its absence. For example, the phrase "(meth)acrylate" includes, in the alternative, acrylate and/or methacrylate.

Unless otherwise stated, all ranges are inclusive and combinable. For example, a stated range of from 0 to 5 mole percent (mol %) isocyanate groups, based on total moles of carbamate groups plus isocyanate groups in a composition, preferably, less than 3 mol %, or, more preferably, less than 1 mol %, and, still more preferably, less than 0.1 mol %, means any of from 0 to 5 mol %, or, from 0.1 to 5 mol %, or, from 1 to 5 mol %, or, from 3 to 5 mol %, or, preferably, from 0 to 3 mol %, or, preferably, from 0.1 to 3 mol %, or, preferably, from 1 to 3 mol %, or, more preferably, from 0 to 1 mol %, or, more preferably, from 0.1 to 1 mol %, or, still more preferably, from 0 to 0.1 mol %.

The present invention provides multicomponent compositions for fast dry to sand time sandable automotive primers, such as compositions enabling a dual cure mechanism may be employed where the carbamate-functional alkyd is crosslinked with a polyaldehyde and the alkyd is oxidatively cured with an iron drier catalyst. The resulting rapid cure multicomponent compositions allow for a short dry time (reducing dirt pickup) for sandability, quick recoating and fast property development such as methyl ethyl ketone (MEK) resistance. The multicomponent compositions of the present invention enable a more rapid dry time than conventional 2 component urethane and epoxy primers. Furthermore, the rapid cure is decoupled from the pot life, with the multicomponent compositions of the present invention having a potlife of several hours to several days, depending on the formulation. Though isocyanate-free automotive refinish primer surfacers exist on the market, the multicomponent compositions of the present invention allow for fast dry times decoupled from pot life that result in a crosslinked urethane primer with superior coating properties. The multicomponent compositions when applied as coating layers can be dried at ambient temperature in less than 1 hour and give dry to sand times as low as 15 to 30 minutes, meaning that the coating has become sandable and will not foul the sanding material.

The composition can comprise from 20 to 90 wt. % of the one or more a) polycarbamates, based on total polycarbamate and polyaldehyde solids, for example, from 25 to 75 wt. %, or, from 30 to 70 wt. %, or, from 35 to 60 wt. %.

The one or more a) polycarbamates can have an average of 2 or more carbamate groups, or, preferably an average of 2.5 or more carbamate groups, such as an average of three or more carbamate groups, or an average of four or more carbamate groups.

Preferably, the one or more a) polycarbamates consists essentially of, and more preferably consists of carbon, hydrogen, nitrogen, and oxygen atoms. Still more preferably the polycarbamate consists of carbon, hydrogen, nitrogen, and oxygen atoms, wherein each nitrogen atom is the nitrogen atom of one of the two or more carbamate groups of the polycarbamate.

The a) polycarbamates of the present invention are substantially isocyanate free. The presence or absence of molecules containing isocyanate groups can be readily confirmed by Fourier Transform Infrared (FT-IR) spectroscopy or carbon-13 nuclear magnetic resonance ($^{13}$C-NMR) spectroscopy.

The a) polycarbamates of the present invention may be prepared by reacting an alkyd polyol or an acrylic polyol with either an unsubstituted carbamic acid alkyl ester or urea in the presence of one or more carbamylation catalysts to give the polycarbamate. An example of this reaction is illustrated graphically below in Scheme (a):

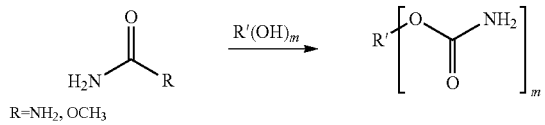

R=NH₂, OCH₃ where R'(OH)$_m$ is an alkyd or acrylic polyol and m is 2 or greater.

The reaction of the acrylic or alkyd polyol and the urea or the unsubstituted carbamic acid alkyl ester comprises heating a reaction mixture of the polyol and urea or the unsubstituted carbamic acid alkyl ester to from 100 to 180° C., or, preferably, from 130 to 165° C. The desired temperature of the reaction mixture depends on solvent used. Lower temperatures are used for solvents that boil (develop a vapor pressure of 1 atmosphere) at lower temperatures of below 100° C., or below 130° C. Higher reaction temperatures help to drive off less volatile solvents, such as aromatic hydrocarbons. The total reaction time of the carbamylation reaction may range from 10 to 40 hours, or, preferably, from 18 to 30 hours.

Compounds suitable as the one or more urea may be any such compound in fluid form, such as urea itself, thiourea, biuret, triuret, N-alkyl substituted ureas that have a low level of toxicity, such as N-methyl urea or N-ethyl urea, and urea clathrates. Substituted ureas can be made by conventional methods as disclosed in U.S. Pat. No. 4,410,697A, to Sandor et al. A urea clathrate, also known as a urea inclusion compound, may have a structure as described in "Supramolecular Chemistry" John Wiley & Sons, Jonathan w. Steed, Jerry L. Atwood, pp. 393-398 and Harris, K. D. M., "Fundamental and Applied Aspects of Urea and Thiourea Inclusion Compounds", Supramol. Chem. 2007, 19, 47-53. The urea in fluid form may be a liquid urea obtained in any known manner, such as, for example, by dissolving it in one or more solvents selected from water and organic alcohols. The urea may be melted or suspended in a clathrate, such as a paraffin or cycloparaffin and rendered fluid by heating.

Suitable alkyd polyols for making the a) polycarbamates of the present invention may be formed from a reactant mixture of one or more monocarboxylic acid oil, one or more polycarboxylic acid having two or more carboxylic acid, salt or halide groups, and one or more polyalcohol comprising a polyalcohol having three or more, preferably from four or more hydroxyl groups, wherein reactant mixture as an excess of total hydroxyl functional groups over total carboxylic, salt, or acyl halide functional groups.

Suitable monocarboxylic acid oils may comprise any fatty acids/triglycerides, saturated monocarboxylic acids or their mixtures. Examples of suitable monocarboxylic acid oils or their corresponding triglycerides for use in making any alkyd polyol of the present invention may include, for example, abietic acid, benzoic acid, tert-butylbenzoic acid, caproic acid, capric acid, acrylic acid, methacrylic acid, crotonic acid, iso-crotonic acid, 2-ethylhexanoic acid, 2-propylheptanoic acid, $C_{12}$ to $C_{32}$ ethylenically unsaturated fatty acids, such as castor fatty acid or castor oil, coconut fatty acid or coconut oil, cottonseed fatty acid or cottonseed oil, lauric acid, linoleic acid, oleic acid, pelargonic acid, arachidonic acid, elupanodonic acid, soybean fatty acid or soybean oil, tall oil fatty acid, safflower fatty acid or safflower oil, linseed fatty acid or linseed oil, sunflower fatty acid or sunflower oil, linolenic acid, eleostearic acid, tung oil, poppy seed oil, *perilla* oil, oiticia oil, fish oil, dehydrated castor oil, castor oil fatty acid, almond oil, bassau oil, cocoa butter oil, macadamia oil, olive oil, peanut oil and/or nahar seed oil.

Preferably, the monocarboxylic acid oils are drying (polyunsaturated) oils which can be cured with a metal drier.

Drying oils may include, but are not limited to, coconut oil, fish oil, linseed oil, tung oil, castor oil, corn oil, rapeseed oil, palm oil, palm kernel oil, tallow, cottonseed oil, safflower oil, sunflower oil, soybean oil, and tall oil.

Alkyds may further include any one or more modifications, for example, alkyd may be urethane modified, acrylic modified, styrene modified, vinyl ester modified, vinyl ether modified, silicone modified, epoxy modified, combinations thereof, and the like.

Suitable polycarboxylic acids for making the alkyd polyol of the present invention may be, for example, any one or more aliphatic, cycloaliphatic or aromatic polycarboxylic acids or their corresponding anhydrides, alkyl esters or acyl halides that have two or more carboxyl, carboxylate, or acyl halide groups, such as, for example, o-phthalic acid or anhydride, isophthalic acid, terephthalic acid, trimellitic acid or anhydride, pyromellitic acid or anhydride, trimesic acid, sodium sulfoisophthalic acid, 1,2-cyclohexane-dicarboxylic acid or anhydride, 1,3-cyclohexanedicarboxylic acid, 1,4-cyclohexandicarboxylic acid, tetrahydrophthalic acid or anhydride, malic acid, maleic anhydride, fumaric acid, adipic acid, azelaic acid, succinic acid or anhydride, tartaric acid, caproic acid citric acid, sebacic acid, itaconic acid, citraconic acid, their anhydrides, mixtures, and their racemates.

Suitable polyalcohols for making the alkyd polyol of the present invention may include, for example, any linear or branched aliphatic, cycloaliphatic or aromatic polyalcohol having three or more hydroxyl groups, or a mixture containing such a polyalcohol with any polyalcohol having two or more hydroxyl groups. Regardless of their number of hydroxyl groups, such polyalcohols may be chosen from polyester polyalcohols, polyether polyalcohols, alkylene glycols, 1,4-butanediol, cyclohexanedimethanols, poly (alkylene) glycols, 2-alkyl-1,3-propanediol or a dimer, trimer or polymer thereof, 2,2-dialkyl-1,3-propanediol or a dimer, trimer or polymer thereof, polycarbonate polyols, glycerol, trimethylolpropane, erythritol, pentaerythritol and dipentaerythritol, sugar alcohols, such as sorbitol, mannitol, and/or any polyalcohol that has been polyalkoxylated, such as a polymethoxylated, polyethoxylated and/or polypropoxylated. The term "alkyl" in this paragraph is herein preferably $C_1$-$C_6$.

Preferably, the one or more polyalcohols used to make the alkyd polyols used to make the a) polycarbamates of the present invention comprise at least 25 wt. %, for example, at least 30 wt. %, or, preferably from 25 to 50 wt. % of one or more polyalcohols having 4 or more hydroxyl groups, based on the total weight of polyalcohols.

Suitable acrylic polyols used for making the one or more a) polycarbamate of the present invention can be any hydroxyl functional acrylic polymer having the desired hydroxyl number or OHEW. Suitable monomers useful for making the one or more acrylic polyols may include, for example, $C_1$ to $C_{18}$ alkyl (meth)acrylates and cycloalkyl (meth)acrylates, such as methyl methacrylate, ethyl acrylate, butyl acrylate and ethylhexyl acrylate, aromatic vinyl monomers, such as styrene and aryl (meth)acrylates, acid functional monomers, such as (meth)acrylic acid, and hydroxyl functional acrylic and vinyl monomers.

Suitable hydroxyl functional acrylic and vinyl monomers for making the acrylic polyol may be any of hydroxyalkyl (meth)acrylates, like hydroxyethyl methacrylate (HEMA), vinyl alcohol, allyl alcohol, and glyceryl methacrylate.

Acrylic polyols generally comprise the polymerization product of from 7 to 50 wt. %, or, preferably, from 20 to 35 wt. % of the hydroxyl functional acrylic and vinyl monomers, based on the total weight of monomers used to make the acrylic polyol, and the remainder of other acrylic or vinyl monomers, such as alkyl, cycloalkyl or aryl (meth)acrylates.

Such acrylic polyols can be made by conventional solution polymerization in an organic solvent in the presence of an oil soluble initiator compound, such as dibenzoyl peroxide, as in known in the art.

Suitable carbamylation catalysts may comprise, for example, any one or more dibutyltin oxide, dibutyltin acetate; tetravalent metal containing catalysts, such as titanium (IV)-containing compounds and zirconium (IV)-containing compounds, like Ti(IV) isopropoxide, Ti(IV) acetylacetonate, Zr(IV) acetylacetonate, Zr(IV) 2-ethylhexanoate, Zr(IV) n-butoxide, Zr(IV) propoxide, Zr(IV) octoate, $ZrOCl_2$, $Zr(OH)_4$, and Zr(IV) carboxyethyl acrylate; divalent metal containing catalysts, such as those containing Manganese(II) or Zinc (II), Calcium(II), Magnesium(II), Lead(II), Cobalt (II) and Barium(II), for example, Mn(II) acetylacetonate, Mn(II) 2-ethylhexanoate, Mn(II) bis(trifluoromethanesulfonate), manganese carbonate, $Mn(ClO_4)_2$, manganese halides, manganese(II) hydroxide and manganese (II) oxide; zinc acetylacetonate, $Zn(ethylhexanoate)_2$, Zn(II) triflate, zinc trifluoro acetate hydrate, zinc oxides, zinc halides, zinc hydroxide and zinc halide hydroxide; Ca(II) acetylacetonate, Ca(II) (ethylhexanoate)$_2$, calcium carbonate, Ca(ClO4)$_2$, calcium halides, calcium hydroxide, calcium methoxide, calcium ethoxide, calcium isopropoxide and Ca(II)oxide; Mg(II) acetylacetonate, Magnesium carbonate, Mg(ClO4)2, magnesium halides, magnesium hydroxide, magnesium ethoxide, magnesium butoxide, and Mg(II)oxide; Co(II) acetylacetonate, Co(II) (ethylhexanoate)$_2$, cobalt(II) halides, cobalt(II) hydroxide and cobalt(II) oxide; Ba(II) acetylacetonate, Ba(II)(ethylhexanoate)$_2$, barium carbonate, Ba(ClO$_4$)$_2$, barium hydroxide and ba(II)oxide; trivalent metal containing catalysts, such as those containing Bismuth(III) ("Bi(III)"), Aluminum (III) ("Al(III)"), Ytterbium (III) ("Yb(III)"), Yttrium (III) ("Y(III)"), Iron (III) ("Fe(III)"), Lanthanum (III) ("La(III)"), Samarium (III) ("Sm(III)") and Ruthenium(III) ("Ru(III)"), for example, Bismuth (III) acetate, Fe(III) tris(2-ethylhexanoate), Fe(III) oxide, Fe(III)isopropoxide, Fe(III) chloride and Fe(III) bromide. Fe(III) tris(2-ethylhexanoate), Fe(III) oxide, Fe(III)isopropoxide, Fe(III) chloride and Fe(III) bromide.

The one or more suitable carbamylation catalysts may be used in a total amount of from 0.1 wt. % to 2 wt. %, or, preferably, from 0.4 wt. % to 0.8 wt. %, based on total reaction mixture solids.

Suitable as the one or more b) polyaldehydes of the multicomponent compositions of the present are any compound having two, three, four or more aldehyde groups, or the acetals or hemiacetals thereof. A polyaldehyde having three aldehyde groups is referred to herein as a "trialdehyde". The polyaldehyde can be any having from 2 to 100 carbons, with the proviso that polyaldehydes having more than 20 carbon atoms will have at least one aldehyde group for every 11 carbon atoms. The polyaldehyde of the present invention is substantially formaldehyde free.

The multicomponent compositions may comprise from 5 to 80 wt. % of the one or more b) polyaldehydes, acetals or hemiacetals thereof component, for example, from 10 to 50 wt. %, based on the total solids weight of the one or more b) polyaldehydes and the one or more a) polycarbamates.

The one or more b) polyaldehydes can be a straight or branched chain aliphatic polyaldehyde; cyclic and non-aromatic polyaldehyde; and/or cyclic and aromatic polyaldehyde.

Suitable polyaldehydes may comprise one or more acyclic, straight or branched polyaldehyde, such as one having from 2 to 16 carbon atoms, or those having 16 carbon atoms prepared by hydroformylating a substantially water insoluble multi-olefin-containing compound that is made from a fatty acid ester or a seed oil, such as a multi-olefin-containing fatty acid triglyceride having 48 carbon atoms or more.

Preferably, the one or more b) polyaldehydes of the present invention comprise one or more cycloaliphatic polyaldehydes, such as, for example, a cycloaliphatic polyaldehyde having from 3 to 20 ring carbon atoms, or, preferably, from 5 to 12 ring carbon atoms.

Preferably, the one or more b) polyaldehydes of the present invention can be a mixture comprising two or more of trans-1,3-cyclohexanedicarboxaldehyde, cis-1,3-cyclohexanedicarboxaldehyde, trans-1,4-cyclohexanedicarboxaldehyde and cis-1,4-cyclohexanedicarboxaldehyde, or protected or blocked forms of these polyaldehydes.

Cyclic, non-aromatic polyaldehydes can comprise one or more polyaldehydes having from 3 to 20 ring carbon atoms. Each cyclic, non-aromatic polyaldehyde component can independently have from 5 to 12 ring carbon atoms, and, can be a mixture of isomers of the same polyaldehyde. Examples of suitable cyclic polyaldehydes are trans-1,3-cyclohexanedicarboxaldehyde; cis-1,3-cyclohexanedicarboxaldehyde; trans-1,4-cyclohexanedicarboxaldehyde; cis-1,4-cyclohexanedicarboxaldehyde; a mixture of 1,3-cyclohexanedicarboxaldehydes and 1,4-cyclohexanedicarboxaldehydes, preferably a 1-to-1 mixture thereof; exo,exo-2,5-norbornanedicarboxaldehyde; exo,exo-2,6-norbornanedicarboxaldehyde; exo,endo-2,5-norbornanedicarboxaldehyde; exo,endo-2,6-norbornanedicarboxaldehyde; endo,endo-2,5-norbornanedicarboxaldehyde; 3-(3-formylcyclohexyl)propanal; 3-(4-formylcyclohexyl)propanal; 2-(3-formylcyclohexyl)propanal; 2-(4-formylcyclohexyl)propanal; and cyclododecane-1,4,8-tricarbaldehyde and a mixture containing one or more of 2,8-, 3,8-, and 4,8-di(formyl)tricyclo[5.2.1.0$^{2,6}$]decane.

The one or more b) polyaldehydes useful in the present invention can be readily obtained or made by known processes, such as oxidation of corresponding polyols, and as disclosed in U.S. Pat. No. 8,653,174B2, to Anderson et al. For example, a preferred mixture of 1,3- and 1,4-cyclohexanedicarboxaldehydes can be prepared by a process comprising reacting acrolein and 1,3-butadiene in a Diels-Alder reaction to give 3-cyclohexenecarboxaldehyde (also called 1,2,3,6-tetrahydrobenzaldehyde), and hydroformylating the 3-cyclohexenecarboxaldehyde.

The one or more b) polyaldehydes of the present invention can be unblocked and unprotected or blocked or protected. Blocked or protected polyaldehydes can be formed by reacting an unblocked and unprotected polyaldehyde with a suitable blocking or protecting group, such as bisulfites (e.g., from reaction of the polyaldehyde with sodium bisulfite), dioxolanes (e.g., from reaction of the polyaldehyde with ethylene glycol), oximes (e.g., from reaction of the polyaldehyde with hydroxylamine), imines (e.g., from reaction of the polyaldehyde with methylamine), and oxazolidines (e.g., from reaction of the polyaldehyde with a 2-aminoethanol).

Preferred protected b) polyaldehydes comprise, a hydrated group ($>C(OH)_2$), hemiacetal, acetal, or imine. These preferred protected polyaldehydes can be prepared by respectively reacting the polyaldehyde with water; one mole equivalent of an alkanol (e.g., methanol or ethanol); two mole equivalents of the alkanol. The hemiacetal, acetal, protecting groups can, if desired, be removed by a deprotection such as hydrolysis to give back the unprotected form of the polyaldehyde. Such aldehyde protecting or blocking groups and formation and removal (i.e., deprotection) is taught, for example, in U.S. Pat. No. 6,177,514 B1.

Preferably, the one or more b) polyaldehydes of the present invention are stable in neat form (i.e., does not materially self-polymerize) and, more preferably, are substantially water insoluble and stable in neat form.

The multicomponent compositions of the present invention further comprise one or more pigments, fillers or extenders. As used herein a "filler" and an "extender" are treated as one and the same thing. Suitable as the one or more pigments may include, for example, carbon blacks, e.g., lamp black, any colored metal oxides, sulfates, silicates and molybdates of iron, e.g. iron oxides, copper, e.g., copper oxides, titanium, e.g., $TiO_2$ or titanium dioxide, nickel, chromium, lead, e.g., lead sulphate, calcium, magnesium, barium, silicates of copper and manganese, as well as organic colorants or dyes. The one or more pigments, fillers or extenders include mixtures or combinations of any of the above, preferably one or more pigments with one or more extenders.

Organic colorants or dyes, such as mono and di-azo pigments such as toluidine red and quinacrodone red, phthalocyanines, ferrocyanates, and molybdates amount of up to 1 wt. %, or from 0.0001 to 1 wt. %, based on the total weight of solids in the multicomponent compositions.

Suitable as the one or more extenders may include, for example, silica, such as fume silica, clay, mica, talc, diatomaceous earth, aluminum silicates, microspheric ceramic beads, zinc oxide, barium sulphate and nepheline syenite.

Preferably, the one or more extender is silica, talc, diatomaceous earth and mixtures containing any of these.

The ambient temperature curable multicomponent compositions of the present invention which comprise a) polycarbamates from drying oil alkyd polyols may further comprise one or more metal driers. Suitable drier salts may be any metal salts, as are well-known in the art and commercially available. Examples of suitable driers are metal salts of (cyclo)aliphatic, natural or synthetic acids, such as, for example, linoleic acid, naphthenic acid and 2-ethylhexanoic acid. Iron, calcium and zinc are suitable drier metals. Mixtures of driers can also be used. In terms of their metal content, the driers are used in a proportion of 0.001 to 3 wt. %, relative to the total solids of the multicomponent compositions.

The ambient temperature curable multicomponent compositions may further comprise one or more acid catalysts. Suitable acid catalysts increase a rate of reaction of a carbamate group (—O—C(=O)—NH$_2$) with an aldehyde group (—C(=O)H). Examples of acid catalysts are Lewis acids (e.g., boron trifluoride etherate) and protic acids (i.e., Brønsted acids), each of which can be unsupported (no solid support) or supported, i.e. covalently bonded to a solid support. Examples of supported acid catalysts are supported curing catalysts such as supported acid catalysts such as acid (H$^+$) forms of cation exchange-type polymer resins (e.g., ethanesulfonic acid, 2-[1-[difluoro[(1,2,2-trifluoroethenyl)oxy]methyl]-1,2,2-tetrafluoroe thoxy]-1,1,2,2-tetrafluoro-, polymer with 1,1,2,2-tetrafluoroethene sold under trade name NAFION NR 50 (E. I. du Pont de Nemours & Co., Inc., Wilmington, Del.) and ethenylbenzenesulfonic acid polymer with diethenylbenzene sold as AMBERLYST™ 15 (The Dow Chemical Company, Midland, Mich.).

Examples of acid catalysts comprise a protic acid characterizable as having a pK$_a$ of 6 or lower, wherein pK$_a$ is negative base-10 logarithm of acid dissociation constant, K$_a$, of the protic acid. A preferred protic acid is an inorganic protic acid or organic protic acid. A preferred inorganic protic acid is phosphoric acid or sulfuric acid. A preferred organic protic acid is a carboxylic acid, such as acetic acid; organophosphonic acid, such as methylphosphonic acid, or organo sulfonic acid, such as methanesulfonic acid, benzenesulfonic acid, camphorsulfonic acid; para-toluenesulfonic acid, or dodecylbenzenesulfonic acid. Examples of suitable Lewis acid curing catalysts are AlCl$_3$; benzyltriethylammonium chloride (TEBAC); Cu(O$_3$SCF$_3$)$_2$; (CH$_3$)$_2$BrS$^+$Br$^-$; FeCl$_3$ (e.g., FeCl$_3$.6H$_2$O); HBF$_4$; BF$_3$.O(CH$_2$CH$_3$)$_2$; TiCl$_4$; SnCl$_4$; CrCl$_2$; NiCl$_2$; and Pd(OC(O)CH$_3$)$_2$.

Suitable amounts of acid catalysts are from 0.001 wt. % to 10 wt. % of the multicomponent composition, based on total solids in the composition, or, preferably, from 0.1 wt. % to 5 wt. % thereof, or, more preferably from 0.1 wt. % to 2 wt. % thereof.

The multicomponent compositions of the present invention may further comprise, conventional additional ingredients, for example, corrosion inhibitive pigments, such as metal phosphates and metal polyphosphates, e.g., zinc polyphosphate, solvents/diluents, rheology modifiers, flow control agents, leveling agents, surfactants, dispersing agents, wetting agents, ultraviolet (UV) light stabilizers, adhesion promoters, catalysts, cure retarders, and auxiliaries.

Advantageously, the multicomponent compositions of the present invention for coating use have a total solids content within the range of from 30 to 90% by volume. So, the coating compositions comprising multicomponent compositions of the present invention can be used as high solids compositions with reduced amounts of volatile organic compounds (VOCs) in low VOC automotive coating compositions, for example, amounts of at most 400 g/L or at most 250 g/L of volume.

A solvent or a blend of solvents is generally utilized to reduce the coating composition to an optimum spray viscosity. Examples of suitable solvents are non-polar or polar organic solvents such as, for example, an aromatic hydrocarbon, aliphatic hydrocarbon, ether, carboxylic ester, ketone, or a mixture of two or more thereof. Examples of suitable solvents include acetone, methyl ethyl ketone, methyl isobutyl ketone, methyl amyl ketone, toluene, xylenes, petroleum distillates, such as Aromatic 100, ethyl acetate and butyl acetate. Preferably, a blend of solvents is used.

Preferably, to reduce or eliminate the correlation between pot life of a composition and coating drying time or coating dry to sand time, or both upon curing thereof, the multicomponent compositions of the present invention comprise one or more curing inhibitors, such as, for example, water or an alcohol, or both. The curing inhibitor delays onset of or increases the cure time of the compositions of the present invention, or both. The curing inhibitor can enable the composition to maintain, if desired, a long pot life (e.g. several hours to several days). Further, the curing inhibitor can be removed from the compositions of the present invention, e.g., by evaporation, when cure is desired, thereby initiating cure or increasing rate of curing thereof without impairing the drying time and time to sand of the compositions when they are coated on a substrate. Suitable curing inhibitors have a boiling point at atmospheric pressure of from ambient temperature to 300° C., or, preferably, at most 250° C., or, more preferably, at least 30° C. or at most 200° C.

The one or more curing inhibitors may be used in total amounts of from 0 to 90 wt. %, or, preferably, from 0.5 wt. % to 60 wt. % or, more preferably, at most 50 wt. %, or, still more preferably, at least 1 wt. % or at most 30 wt. %, based on the total weight of solids of the composition of the present invention. Most preferably, the curing inhibitors are used in total amounts of less than 20 wt. %, or even still more preferably, less than 10 wt. %, based on the total weight of solids of the composition of the present invention.

Suitable UV light stabilizers are any such as hindered amines, like bis-(1-octyloxy-2,2,6,6-tetramethyl-4-piperidinyl) sebacate (e.g. Tinuvin™ 123 light stabilizer supplied by BASF, Leverkusen, Del.); suitable dispersing agents are any such as polyphosphoric acid polyesters (e.g. Disperbyk™ 110 supplied by BYK USA, Inc., Wallingford, Conn.); suitable leveling agents are such as polyether modified polydimethylsiloxanes; and rheology modifiers such as organowaxes (e.g. Troythix™ 21 BA wax supplied by Troy Corporation Florham Park, N.J.).

Preferably, methods of using the multicomponent compositions of the present invention comprise applying the compositions to at least a portion of the surface of the substrate and curing the curable coating of the multicomponent compositions so as to prepare a coated substrate comprising a crosslinked polyurethane.

The curing temperature of the ambient temperature curable composition is from ambient temperature to 80° C., or, preferably, 60° C. or lower, or, more preferably 40° C. or lower, or, even more preferably, 30° C. or lower. A preferred minimum effective curing temperature is a minimum temperature effective for curing the invention ambient temperature curable composition to yield the invention crosslinked polyurethane within 7 days. The ambient temperature for curing may be 0° C. or more or up to 40° C., or, at least 10° C. A preferred ambient temperature for curing is from 20° C. to 30° C.

The multicomponent compositions can be applied to the surface of the substrate(s) by any suitable applying means such as, for example, brushing, spraying, or dipping.

EXAMPLES

Unless otherwise specified, all temperatures are room temperature and all pressures are 1 atmosphere or ambient pressure.

Example A

Two Stage Alkyd Polyol Synthesis

First Stage: Alcoholysis. To a 5 L three-neck round bottom flask was added sunflower oil (1388.9 g). A glass stir rod and paddle were placed in the middle joint of the flask. The flask was attached to a lattice with overhead stirring, and an oil bath at room temperature was raised to submerge the flask. The setpoint on the bath was 220° C. and heating and stirring were started. To the stirred oil, pentaerythritol (713.6 g) and dibutyltin catalyst (1200 ppm on total reactor charge were added. Once all reactants were added, a packed condenser with a set point of 95° C. was attached to one of the side joints and topped with a hose adaptor that was connected to a bubbler. To the other side neck, a second hose-adaptor was attached and connected to a nitrogen inlet. A slow nitrogen sweep was placed on the system and observed in the bubbler. The reaction mixture was allowed to heat and mix overnight to ensure high conversion. This stage was completed when a "monoglyceride" of the sunflower oil was achieved, meaning that the reactor contents homogeneously dispersed in methanol at one part resin to three parts methanol.

Second Stage. The 5 L three-neck flask containing the alcoholysis mixture from the first stage was equipped with a glass stir shaft and paddle. The flask was attached to a lattice with overhead stirring. An oil bath at room temperature was raised to submerge the flask. The set point on the bath was 220° C. and heating and stirring were started. To the flask, isophthalic acid (359.0 g), phthalic anhydride (538.5 g), and xylenes (2% on total charge) were added. Then, a Dean-Stark trap was connected to one of the side joints and topped with a Friedrichs condenser connected to an outlet bubbler. A nitrogen sweep was placed on the system. The system was allowed to heat (220° C.) and the water formed was distilled out as an azeotrope with xylenes. This second stage of the reaction was monitored by removing samples from the reactor and titrating the acid value (AV). The reaction was allowed to progress until the desired AV (8.0 mg KOH/g) was reached. The alkyd polyol had a measured OH number of 180 mg KOH/g (on solids). Then the reaction contents were poured into a glass jar and allowed to cool to room temperature under a pad of nitrogen.

Example B

Alkyd Polycarbamate Synthesis

A reaction was carried out in a 2000 ml round bottom reactor system equipped with a mechanical stirrer, reflux condenser, nitrogen gas purge system and temperature control. A heating mantle was used for temperature control. The reactor was charged with the alkyd polyol (2000 g) from Example A, above, diluted to a final solids level of 60-70% in xylene, to achieve a process viscosity which allowed efficient stirring at 140° C. The catalyst, Fascat™ 4201 dibutyl tin oxide (DBTO, Arkema, Inc., Philadelphia, Pa.), was added to the alkyd polyol in the reactor at 0.6 wt. % on solids. The amount urea (99.5 wt. % pure, Sigma-Aldrich, St. Louis, Mo.) used was calculated based on the hydroxyl value for the alkyd polyol to target 62% conversion of the hydroxyl groups. For the 2000 g batch of alkyd polyol, 238.7 g total of urea was first dissolved in distilled water to make a 50 wt. % aqueous solution. The alkyd-solvent-catalyst mixture in the reactor was slowly heated to 140° C. and nitrogen purged for at least 30 min. Urea solution was loaded into 60 ml glass syringes and was carefully fed into the reactor at a constant controlled rate through a syringe pump. The urea solution was steadily fed into the reactor over 6-10 hrs. Azeotropic vapor was formed and cooled in the condenser, which was then collected in the Dean-Stark trap. The reaction was carefully maintained at 140° C., mixing at 500-600 rpm and continued for 10-12 hr. until completion. Samples were taken periodically for NMR and GPC analysis. The Carbamate Conversion (from hydroxyl to carbamate) was calculated at 66%.

Example C

Acrylic Polyol Synthesis

A 5 liter, 2 piece round bottom reactor was equipped with a five port head. The middle neck of the head was equipped with a Teflon stir bearing and mixing shaft; one side neck had an adapter allowing 2 feed lines to enter the reactor; another neck had a thermocouple; another neck had a nitrogen inlet; and the last neck was equipped with a Freidrich's condenser.

Charged to a glass jar and placed on a balance was 3000 grams of a monomer mixture consisting of 30 weight percent 2-hydroxyethyl methacrylate, 56 weight percent 2-ethylhexyl acrylate, 13 weight percent methyl methacrylate and 1 weight percent acrylic acid. Separately, 96 grams of initiator (50 weight percent t-butyl peroxyacetate in mineral spirits) and 375 grams xylenes were charged to a jar and placed on a balance.

An initial charge of 345 grams of a mixture of xylenes was added to the flask and heated to 140° C. using a heating mantle, with gentle stirring and a low nitrogen flow. When the reactor contents reached 140° C. the nitrogen flow was stopped and 5 wt. % of the monomer mix was added as a heel; then once back to reflux, 5 wt. % of the initiator blend was added and the monomer and initiator pumps were started. The monomer and initiator were added to the reactor using 2 FMI QG-20 lab pumps (Fluid Metering Inc., Syosset, N.Y.) at a flow rate of, for the monomer blend, 19.0 g/min and, for the initiator blend, 2.76 g/min. The flow rates were calculated to feed the initiator for 15 minutes longer than the monomers so the initiator may act as a chaser. Flow rate was monitored by weight loss. The contents were held at temperature for 15 additional minutes after the initiator feed was depleted. Then, 194 grams of a mixture of xylenes was added and allowed to mix for 15 additional minutes before being poured out.

The resulting acrylic polyol solution had a measured OH number of 128 mg KOH/g (on solids), a solid content of 76 weight percent, and a glass transition temperature of −7.4° C.

Example D

Synthesis of Acrylic Polycarbamate

To a 3 necked one liter round bottom flask equipped with a mechanical stirrer, a thermocouple, a nitrogen inlet and a Freidrich's condenser was added 331 grams of the acrylic polyol from Example C, above, 118 grams of xylenes and 2.4 grams of dibutyl tin oxide catalyst. The reaction contents were then brought to reflux (approximately 140° C.) using a heating mantle. Then, 59 grams of a 50 weight percent aqueous solution of urea was fed to the reactor over 6 hours using a syringe pump. The reactor was maintained at temperature for an additional 12 hours to complete the reaction. The Carbamate Conversion was calculated at 80%.

The polycarbamate from Example B was formulated as shown in Example 1, below.

Example 1

Multicomponent Composition Formulation of Polycarbamate from Alkyd Polyol

TABLE 1

Formulation of a multicomponent composition

| Material | Weight (g) |
|---|---|
| Component A | |
| Alkyd polycarbamate (68 wt. % in Xylene) | 5.98 |
| Toluene | 5.50 |
| Methyl Ethyl Ketone | 1.56 |
| Tiona ™ RCL9 Titanium Dioxide (Cristal, Hunt Valley, MD) | 0.866 |
| Monarch ™ 1000Carbon Black (Cabot, Boston, MA) | 0.019 |
| Nicron ™ 402 Talc (Imerys, Paris, France) | 4.34 |
| OptiWhite ™ Calcined Aluminum Silicate (Burgess, Sandersville, GA | 1.58 |
| Cimbar ™ Barium Sulfate (Cimbar, Cartersville, GA) | 0.73 |
| Ethanol (curing inhibitor) | 2.08 |
| Diacetone alcohol | 0.42 |
| Borchi Oxy Coat ™ Iron Drier catalyst (OMG-Borchers, Langenfield, Germany) | 0.21 |
| Aerosil ™ R972Fume Silica (Evonik, Parsippany, NJ) | 0.10 |
| Component B | |
| Cyclohexanedicarboxaldehyde (CHDA 89.8 wt. % solids in Heptane) | 1.37 |
| Component C | |
| para-toluene sulfonic acid (pTSA, 40 wt. % in isopropanol) (King Industries, Norwalk, CT) | 0.25 |
| Total | 25 |

Using a FlackTek™ DAC 150 speed mixer (FlackTek, Landrum, S.C.), the polycarbamate of Example B (carbamylated alkyd) and the toluene, xylene, titanium dioxide, carbon black, talc, calcined aluminum silicate, and barium sulfate of component A in Table 1, above, were dispersed to Hegman 4 and let down with ethanol, diacetone alcohol, iron drier, and fumed silica to give component A. Prior to spraying the formulation, component B (CHDA) from Table 1, above, was added to with overhead mixing; and, then component C was added with overhead mixing. The resulting formulation had a Pigment Volume Concentration of 32% PVC.

The formulated primer was charged into a DeVilbliss™ FLG3 (and FLG4) (Swanton, Ohio) with an air pressure of 193 KPa at the regulator, fluid tip of 2.2 mm, and a #3 aircap. Phosphate treated steel panels were sprayed at a distance of 15 to 20 cm from the panel at a fan pattern of 15 to 20 cm top to bottom. Time to sand was measured for each coat applied, as described below.

Example 2

Multicomponent Composition Formulation of Polycarbamate from Acrylic Polyol

To make the formulation in Table 2, below, component A was mixed in a FlackTek DAC 150speed mixer (FlackTek, Landrum, S.C.) until homogeneous. With stirring, cyclohexanedialdehyde (CHDA) was added to component A, followed by addition of acid catalyst, pTSA. The resulting primer formulation had a pigment volume concentration (% PVC) of 40.4%.

TABLE 2

Formulation of a multicomponent composition

| Component A | Grams |
|---|---|
| Acrylic polycarbamate (69.58 wt. % in butyl acetate) | 185.28 |
| Aromatic 100 (solvent petroleum distillates, ExxonMobil, Irving, TX) | 242.29 |
| Methyl Amyl Ketone (solvent) | 44.47 |
| DISPERBYK-110 (phosphoric acid functional solution polyester dispersant 52% solids in methoxypropylacetate/alkylbenzenes (Byk USA, Wallingford, CT) | 33.07 |
| Tiona ™ 595 TiO$_2$ (pigment) (Cristal, Hunt Valley, MD) | 99.77 |
| Monarch ™ 120 Carbon Black (pigment) (Cabot, Boston, MA) | 1.14 |
| Nicron ™ Talc 665 (Imerys, Paris, France) | 99.77 |
| OptiWhite ™ Calcined Aluminum Silicate (Burgess, Sandersville, GA) | 65.56 |
| Milwhite ™ B1 barytes (Milwhite, Brownsville, TX) | 114.02 |
| Calcined Diatomaceous Earth Celite ™ 499 (Imerys, Paris, France) | 10.26 |
| Ethanol (curing inhibitor) | 59.18 |
| Diacetone alcohol (solvent) | 11.83 |
| Component A Total | 966.64 |
| CHDA (89.8 wt. % solids Heptane) | 18.37 |
| para-toluene sulfonic acid (pTSA, 40 wt. % in isopropanol) (King Industries, Norwalk, CT) | 14.99 |
| Total Formulation | 1000.00 |

To apply the primer formulation, a 10×30 cm phosphate treated cold roll steel panel was thoroughly cleaned with DX 330™ Wax and Grease Remover (PPG, Pittsburgh, Pa.). When wiping the cleaning fluid off the panel, the panel was wiped completely dry and any film residue was removed. Using a DeVilbliss™ FLG3 (and FLG4) (Swanton, Ohio) with an air pressure of 193 KPa at the regulator, fluid tip of 2.2 mm, and a #3 aircap. pneumatic paint gun, 2 full wet coats of primer was applied at a distance of 20 to 25 cm from the panel, and the spray pattern was adjusted to be vertically 20 to 25 cm wide when at proper distance. Application followed the paint gun manufacturer's direction on recommended air pressure during application. Ten minutes of flash time was required between coats to allow individual coats to briefly cure, which aids in building the primer film to proper thickness.

Comparative Example 1

Comparative example 1 used a commercially available two-component polyurethane primer surface which was used as obtained. The comparative primer was sprayed using the same procedure as described in Example 1, above.

The applied primers in Examples 1 and 2 were tested, as follows:

Sanding:

To test the dry through time a 10 cm Dura-Block™ (Trade Associates, Inc. Kent, Wash.) was used with a piece of no. 320 grit sandpaper. The panels were sanded in a cross-directional pattern to check if resin caking was present. If caking was present, the primer was not through cured and needs to cure longer before final sanding. If dry caking was present, which could be removed from the sandpaper, the primer was ready to sand. The Sanding results for Examples 1 and Comparative Example 1 are presented in Table 3, below. MEK results are presented in Table 4, below.

Substrate Preparation: Test panels were prepared for refinish with a Hutchens 4500 (Hutchens, Pasadena, Calif.) 15 cm finish DA sander with 320 grit sandpaper. After the panel was sanded smooth, blow the panel off with compressed air to remove dust from the prepared surface. Using a red Scotch-Brite™ pad scuff (3M, Minneapolis, Minn.) the surface in a uniform direction until all scuff marks are the same depth and direction.

MEK Double Rubs:

According to ASTM D7835 2013) Solvent resistance and degree of crosslinking was evaluated using a semi-automated MEK rub test machine (DJH Designs Inc., Oakville, ON). The coated substrates were rubbed with a cloth soaked in methyl ethyl ketone (MEK) that is attached to the rubbing block of the test machine. Each back and forth rub counts as one double rub. The machine applied constant downward pressure (551 KPa), constant speed (70 double rubs/min) and counts the number of double strokes applied. Acceptable result is 15 or more rubs, or, preferably, 25 or more rubs. Results are shown in Table 4, below.

Dry time:

Dry time was tested according to according to ASTM-D 5895 (2013).

TABLE 3

Dry to Sand times

| Comparative Example 1 | | | Example 1 | | |
|---|---|---|---|---|---|
| Number Of Coats | Dry Film Thickness | Dry to Sand Time | Number Of Coats | Dry Film Thickness | Dry to Sand Time |
| Medium Build | | | | | |
| 1 | 30 um | 4 hours | 1 | 27.5 um | 15 min |
| 2 | 48 um | 4 hours | 2 | 65 um | 15 min |
| 3 | 60 um | 4 hours | 3 | 90 um | 15 min |
| Heavy Build | | | | | |
| 1 | 60 um | 4 hours | 1 | 57.5 um | 30 min |
| 2 | 100 um | 4 hours | 2 | 102.5 um | 30 min |
| 3 | 117.5 um | 4 hours | 3 | 147.5 um | 30 min |

As shown in Table 3, above the Example 1 inventive primer showed a very short dry to sand time regardless of primer thickness or the number of primer coats. The comparative Example 1 primer took many times longer to dry enough for sanding. The time indicated for each successive coat is the time it took for that one coat to dry.

In Example 2, sanding the primer showed no resin caking within 45 minutes to 1 hour, although, there was some dry caking of primer on the 320 grit sandpaper.

TABLE 4

MEK Double Rubs

| Cured for 6 hours @ RT | 15 MEK Double Rubs | 50 MEK Double Rubs |
|---|---|---|
| Comparative Example 1 | Severe Break Through | Complete Failure |
| Example 1 | Slight Burnish | Moderate Break Through |

The solvent resistance results in Table 4 show that the Example 1 primer having a coating thickness of 27.5 um dramatically outperformed the Comparative Example 1 primer having a coating thickness of 30 um.

We claim:

1. A substantially isocyanate free, ambient temperature curable, multicomponent, sandable, automotive primer composition having a pigment volume concentration (% PVC) of from 20 to 60 comprising:
   one or more pigments, extenders and/or fillers,
   one or more a) polycarbamates of an alkyd polyol, an acrylic polyol, or their mixtures, and
   one or more b) polyaldehydes or acetals or hemiacetals thereof in a component separate from the one or more polycarbamates,
   wherein the composition has from 0 to 5 mole percent (mol %) of isocyanate groups, based on total moles of carbamate groups plus isocyanate groups in the composition; and
   wherein the composition has a dry to sand time of less than or equal to 60 minutes when cured at a temperature of from ambient to 30° C., according to ASTM D-5895 (2013).

2. The multicomponent composition as claimed in claim 1, wherein the composition further comprises one or more acid catalyst or metal drier.

3. The multicomponent composition as claimed in claim 1, wherein the one or more a) polycarbamates is a polycarbamate of an alkyd polyol and the alkyd polyol has a hydroxyl number of from 50 to 250.

4. The multicomponent composition as claimed in claim 3, wherein the alkyd polyol is a short or medium oil alkyd polyol.

5. The multicomponent composition as claimed in claim 1, wherein the alkyd polyol is the reaction product of one or more monocarboxylic acid oil, one or more polycarboxylic acid having two or more carboxylic acid, salt or halide groups, and one or more polyalcohol having three or more hydroxyl groups.

6. The multicomponent composition as claimed in claim 1, wherein the one or more a) polycarbamates is a polycarbamate of an acrylic polyol and the acrylic polyol has a hydroxyl number of from 50 to 250.

7. The multicomponent composition as claimed in claim 1, wherein the one or more a) polycarbamates has an average of 2 or more carbamate groups.

8. The multicomponent composition as claimed in claim 1, wherein the composition comprises one or more pigment and one or more extender.

9. The multicomponent composition as claimed in claim 1, wherein the composition has a % PVC of from 25 to 50.

10. The multicomponent composition as claimed in claim 1, wherein the composition comprises, based on total polycarbamate and polyaldehyde solids,
   20 to 90 wt. % of the one or more a) polycarbamates, and
   10 to 80 wt. % of the one or more b) polyaldehydes or acetals or hemiacetals thereof.

11. A method for using the composition as claimed in claim 1, comprising applying the composition to an automotive substrate, to form a primer coating layer, curing the primer coating layer to form a crosslinked polyurethane at a temperature of from ambient to 80° C., for a period long enough to enable sanding of the coating layer, and sanding the primer coating layer to form a smooth primer coating layer.

12. An automotive finish comprising:
   an automotive substrate;
   one or more crosslinked polyurethane smooth primer coating layers disposed on the automotive substrate, obtained by applying the automotive primer composition of claim 1 to at least a portion of a surface of the automotive substrate and curing the automotive primer composition;
   a cured pigmented basecoat or colorcoat layer disposed on the one or more smooth primer coating layers;
   and a cured clearcoat layer disposed on the cured pigmented basecoat or colorcoat layer.

* * * * *